United States Patent [19]

Kanayama et al.

[11] Patent Number: 4,914,453

[45] Date of Patent: Apr. 3, 1990

[54] INK RESERVOIR OF INK JET PRINTER

[75] Inventors: Yoshio Kanayama, Nabari; Hirokazu Kohda, Gose, both of Japan

[73] Assignee: Sharp Kabushiki Kaisha, Osaka, Japan

[21] Appl. No.: 341,490

[22] Filed: Apr. 21, 1989

[30] Foreign Application Priority Data

Apr. 25, 1988 [JP] Japan ............................ 63-55516[U]

[51] Int. Cl.4 ............................................ G01D 15/18

[52] U.S. Cl. .................................. 346/140 R; 346/75

[58] Field of Search .................... 346/140 PD, 140 IJ, 346/75

[56] References Cited

U.S. PATENT DOCUMENTS

| | | | |
|---|---|---|---|
| 4,558,326 | 12/1985 | Kimura et al. | 346/140 PD X |
| 4,641,154 | 2/1987 | Mikalsen | 346/140 PD |
| 4,658,273 | 4/1987 | Yuki et al. | 346/140 PD |
| 4,689,642 | 8/1987 | Sugitani | 346/140 PD |
| 4,734,718 | 3/1988 | Iwagami et al. | |

FOREIGN PATENT DOCUMENTS 61-185451 8/1986 Japan .

OTHER PUBLICATIONS

"Nikkei Electronics", Oct. 3, 1977, pp. 72-85.

*Primary Examiner*—George H. Miller, Jr.
*Attorney, Agent, or Firm*—Birch, Stewart, Kolasch & Birch

[57] ABSTRACT

An ink reservoir of an ink jet printer which comprises an ink tank having an ink outlet storing ink and feeding the stored ink to a nozzle (13) and a vent hole for circulating air between an external atmosphere and an internal space, an outlet opening/closing means movably provided for being able to open and close the ink outlet; vent hole opening/closing means (56) and (57) movably provided for being able to open/close the vent hole, and operation transferring means for mechanically transferring movement of the outlet opening/closing means to the vent hole opening/closing means so as to interlock the operation of the outlet opening/closing means with the operation of the vent hole opening/closing means. When the outlet opening/closing means performs its operation, the operation is transferred by the operation transferring means to open/close the vent hole opening/closing means.

25 Claims, 8 Drawing Sheets

INK RESERVOIR OF INK JET PRINTER

BACKGROUND OF THE INVENTION

1. Field of the Invention

The present invention relates to an ink reservoir of an ink jet printer for supplying ink to a nozzle portion jetting the ink and, more particularly, to an ink reservoir of an ink jet printer comprising a mechanism for opening and closing an outlet feeding the ink.

2. Description of the Related Art

An ink jet printer drawing a letter or a diagram on paper by jetting ink in th state of particles and controlling its direction is already well-known. Especially, an an ink on demand system which jets ink particles at need has been developed recently, its range for application is wide spread. For example, a fundamental description of the ink jet printer is given, focusing on the trends of development of an ink gun of the ink on demand type ink jet printer, in "*NIKKEI ELECTRONICS*", Oct. 3, 1977, pp. 72∼85.

Referring to FIGs. 1 to 4, a description is given of a whole structure of a conventional ink jet printer in general.

FIG. 1 is a plan view showing a whole structure of a conventional ink jet printer and FIG. 2 is a sectional view taken along a line A—A in FIG. 1. Referring to FIGS. 1 and 2, slide shafts 2 and 3 are disposed on a parallel with the axis of a cylindrical platen 1 and have both ends fixed to a frame 4. A carriage 6 equipped with an ink tank 5 is supported movably in a horizontal direction along the platen 1 by slide shafts 2 and 3. A wire extended around a drum 8 and pulleys 9 and 10 connected to the rotary shaft of a motor 7 is attached to the carriage 6. The carriage 6 moves back and forth within a writing region on the right side from a home position 5A by the rotation of the motor 7 during printing and is positioned at the home position 5A when not printing (in waiting).

A printing head portion 12 is disposed ahead of the carriage 5 so as to be opposed to the platen 1. Nozzles 13 each gradually changed in height are disposed, as shown in FIG. 3, on the printing head portion 12. A mechanism for jetting ink from this nozzle 13 is enlarged and shown in FIG. 4. Operation of the ink jet from the nozzle 13 is as follows. That is, the nozzle 13 is filled with ink through a capillary 14 by a capillary phenomenon. The ink in this nozzle is jetted from a nozzle outlet 17 to the outside by pressure applied to a pressure chamber 16162 the pumping operation of a piezoelectric element 15.

An opening/closing means 19 for opening/closing an ink outlet feeding ink 18, in the ink tank 5, to the capillary 14 is provided at the front of the ink tank 5 see the left portion in FIG. 2). The opening/closing means 19 comprises an ink outlet 20 formed on the bottom portion of the ink tank 5, an opening/closing lid 21 made of rubber for opening/closing the ink outlet 20, an operating rod 22 protruded from the lid 21 upward in the ink tank 5, a bellows-type expansion sleeve 23 covering around the operating rod 22, a compression coil spring 24 attached at the upper edge of the operating rod 22; and a spring bearing member 25 receiving the compression coil spring 24. The end of the operating arm 27 extended from a maintenance station 26 is placed on the upper portion of the spring bearing member 25. The operating arm 27 is vertically about a supporting point 30 by the vertical movement of a cam follower 29 following the rotation of an eccentric cam 28. When the end of this opening arm 27 falls to push the upper surface of the spring bearing member 25, 'the opening/closing lid 21 falls against the force of the compression spring 24 to open/close the ink inlet 20. When the downward force of the operating arm 27 is relieved, the opening/closing lid 21 is raised by the force of th compression spring 24 to open the ink inlet 20.

In addition, the maintenance station 26 comprises nozzle protecting means 31 for preventing the nozzle 13 from becoming clogged up, which is forced in a direction away from the printing head 12 by an extension spring 32. This nozzle protecting means 31 can be moved horizontally together with the rotation of the eccentric cam 33 and abuts on the printing head portion 12, which waits at the home position 5A, to prevent clogging such as suction due to a reduced pressure at the outlet portion 17 of the nozzle 13 when the ink printer power is off. An apparatus for preventing the nozzle from clogging up is disclosed in detail in Japanese Paten Laid-Open No. 185451/1986 (corresponding to U.S. Pat. No. 4,734,718).

The nozzle protecting means 31 is mutually interlocked withthe operating arm 27 because the eccentric cams 28 and 33 are integrally rotated about the same axis. More specifically, when the ink jet printer power is off and the printing head portion 12 waits at the home position 5A, the nozzle protecting means 31 abuts on the printing head portion at the same time the end of the operating lever 27 pushes the spring bearing member 25, causing the opening/closing lid 21 to close the ink outlet 20. In addition, when the ink jet printer power is on, the opening/closing lid 21 is raised at the same time the nozzle protecting means 31 goes away from the printing head portion 12, to open the ink outlet 20. FIG. 2 shows the state just after the printing head portion 12 reaches the home position 5A. Therefore, the state of the ink tank 5 is the same as that of printing, that is, both ink outlet 20 and vent hole 34 provided on the upper portion of the ink tank 5 are opened. The vent hole is opened during printing in order to prevent bubbles from entering into the nozzle 13 such that the pressure in the ink tank 5 may not become negative even if the ink jet is jetted from the nozzle 13.

When the ink jet printer power is off, the outlet opening/closing means 19 is in the state shown in FIG. 5, that is, the state in which the opening/closing lid 21 closes the ink outlet 20 and the vent hole 34 equipped with the cap 35 which closes it. In this manner, the ink is prevented from leaking during transportation by closing the vent hole 34 at the time the power is off. An ink inlet 36 is provided on the upper portion of the ink tank 5 other than the vent hole 34. This ink inlet 36 is provided for supplying ink to the ink tank 5 by attaching an ink cartridge (not shown) to this and the ink is prevented from escaping out of the ink inlet 36 by closing the ink inlet 36 with the cap 37 except for the time when ink is supplied.

The ink reservoir comprising the ink tank 5 and the outlet opening/closing means 19 of the above-described conventional ink jet printer as its main part has the following disadvantages.

In the above conventional ink reservoir, since the closing operation of the vent hole 36 is performed using the cap 35 by hand, the vent hole 34 is sometimes left opening during transportation and ink leaks out of the ink inlet to contaminate around and interrupts the operation of the other mechanisms.

Contrarily, there is a case where the printing operation is performed after transportation with the vent holes 34 closed with the cap 35, causing a pressure inside of the ink tank to be reduced and air to enter from the nozzle 13, with the result that ink is not smoothly supplied.

In addition, an ink supplying apparatus of an ink jet printer having the same fundamental structure as the above is disclosed in Japanese Patent Laid Open Gazette No. 188154/1986. The apparatus in that disclosure comprises a mechanism for preventing human error in handling a transportation cap closing the ink inlet when the ink jet printer is transported. However, in this conventional technique, means for preventing failure of the opening/closing operation of the vent hole is not disclosed.

SUMMARY OF THE INVENTION

An object of the present invention is to provide an ink reservoir of an ink jet printer wherein failure of the opening/closing operation of a vent hole by human is avoided by mechanically interlocking the opening/closing operation of the outlet opening/closing means with the opening/closing operation of the vent hole opening/closing means.

Another object of the present invention is to provide an ink reservoir of an ink jet printer capable of effectively using a space by providing a vent hole on an ink inlet of an ink tank.

A further object of the present invention is to provide an ink reservoir of an ink jet printer capable of being manufactured and assembled easily by supporting a vent hole opening/closing means and operation transferring means on the same member.

The ink reservoir of the ink jet printer in accordance with the present invention is an ink reservoir of an ink jet printer for supplying ink to a nozzle portion jetting the ink and comprises and ink tank having an ink outlet which stores ink and feeds the stored ink to a nozzle and a vent hole for circulating air between an external atmosphere and an internal space. This ink reservoir further comprises a outlet opening/closing movably provided to open/close the ink outlet and vent hole opening/closing means movably provided to open/close the vent hole. In addition, it comprises an operation transferring means for mechanically transferring the movement of the outlet opening/closing means to the vent hole opening/closing means so as to interlock the opening/closing operation of the outlet opening/closing means with the operation of the vent hole opening/closing means.

According to the ink reservoir of the ink jet printer having the structure of the present invention, the opening/closing operation of the outlet opening/closing means is transferred to the vent hole opening/closing means by operation of the transferring means and the vent hole opening/closing means operates in response to the transferred operation of the outlet opening/cosing means.

The ink resevoir of the ink jet printer in accordance with another aspect of the present invention is an ink reservoir of an ink jet printer for supplying ink to a nozzle portion jetting ink and comprises an ink tank having an ink outlet, which stores ink and feeding ink to a nozzle portion and an ink inlet for supplying ink. The ink reservoir further comprises an outlet opening/closing means movably provided to open/close an ink outlet, an attaching member fixed to the ink tank, and an inlet cover attached to the attaching member so as to be able to move between a position covering the ink inlet and a position exposing the ink inlet. This ink reservoir further comprises an inlet cap having a vent hole for closing the ink inlet, vent hole opening/closing means attached to the inlet cover for opening/closing the vent hole, and an operation transferring means for mechanically transferring the movement of the outlet opening/closing means to the vent hole opening/closing means so as to interlock the operation of the outlet opening/closing mean with the operation of the vent hole opening/closing means.

According to the ink reservoir of the ink jet printer having such a structure of the present invention, a vent hole can be disposed at the same position as that of the ink inlet. In addition, the vent hole opening/closing means and operation transferring means are all attached to a inlet cover serving as one member, whereby these parts can be assembled in advance as a unit.

BRIEF DESCRIPTION OF THE DRAWINGS

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
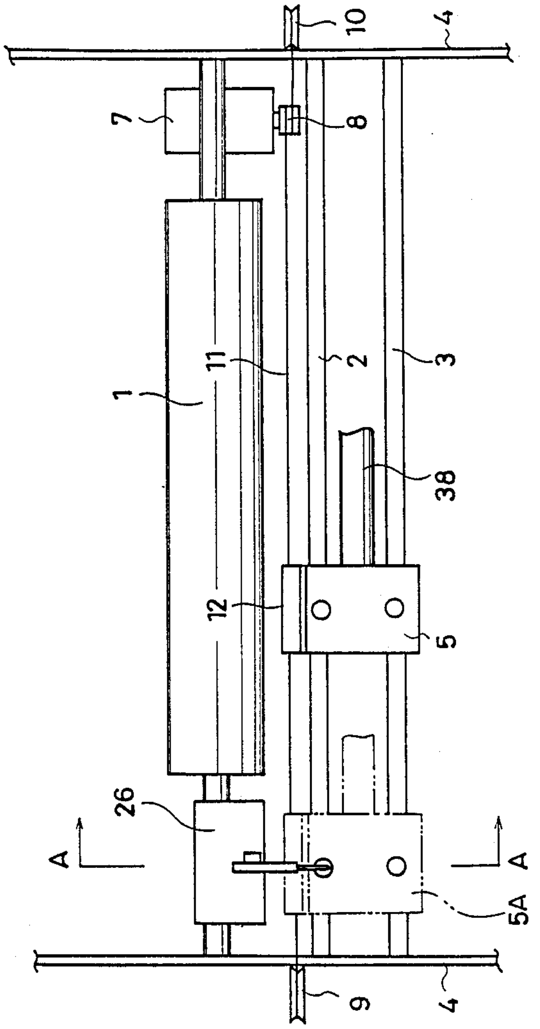
FIG.1 PRIOR ART
FIG. 1 is a plan view showing the whole structure of a conventional ink jet printer in general.

The whole structure of the ink jet printer using the ink reservoir of the present invention is almost the same as the conventional one shown in FIG. 1.

Figure 6:
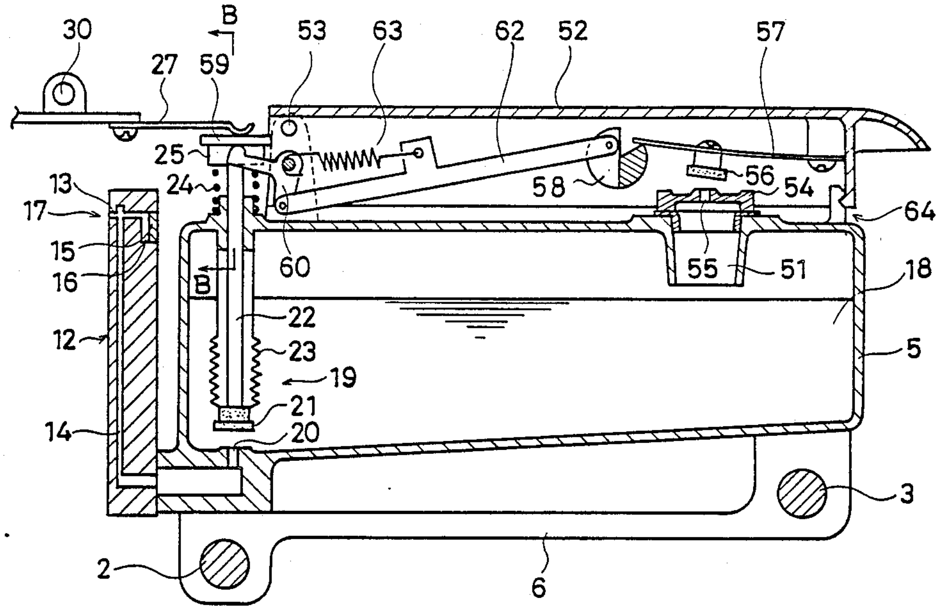
FIG. 6 is a sectional view of the ink reservoir of the ink jet printer which is in a power on state in one embodiment of the present invention.
Figure 7:
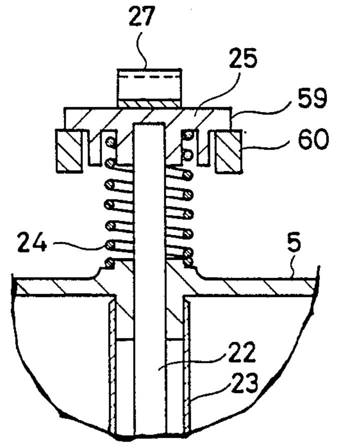
FIG. 7 is a sectional view taken along a line B—B in FIG. 6.
Figure 8:
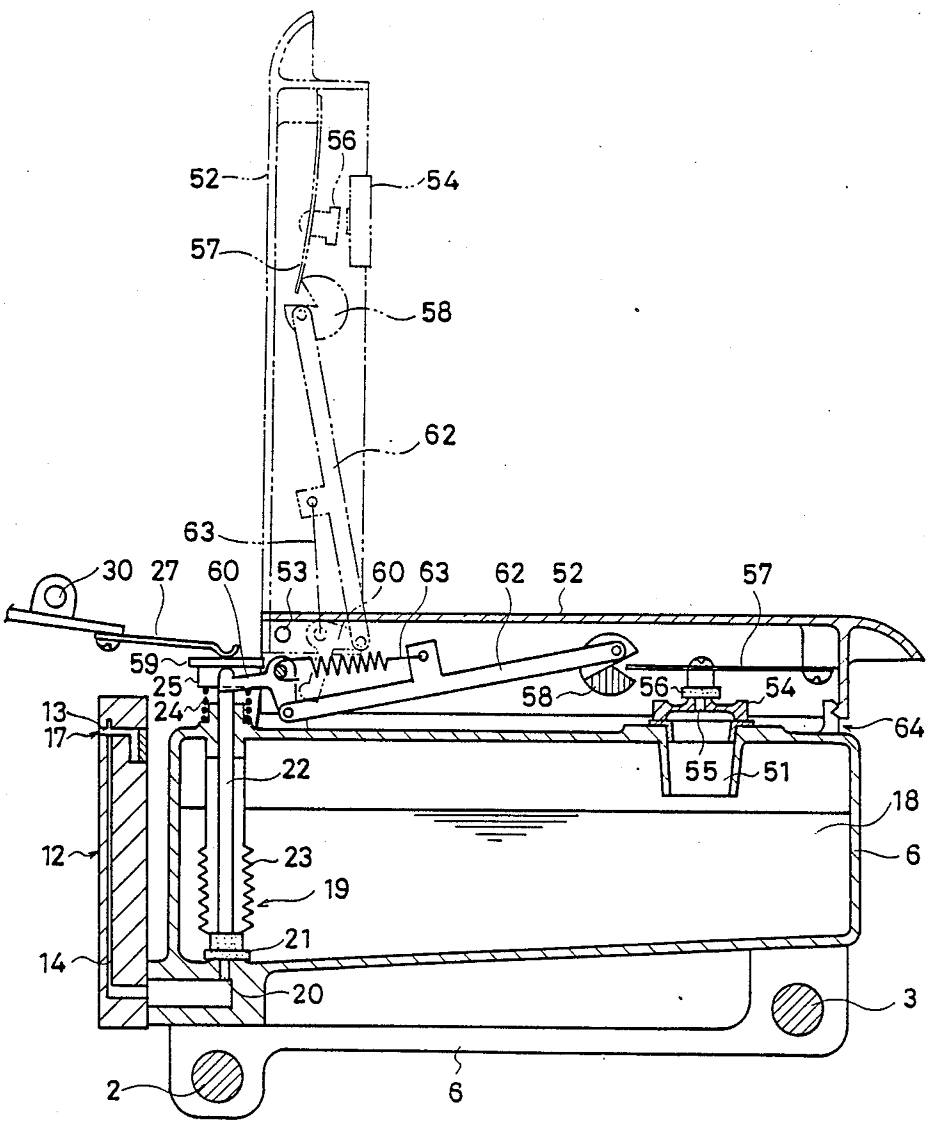
FIG. 8 s a sectional view showing the state of the ink reservoir when the ink printer is in a power off state which corresponds to FIG. 6.

Referring to FIGS. 6, 7 and 8, a carriage 6 is movably attached to a pair of slide shafts 2 and 3 disposed in parallel to the front portion of the platen 1. An ink tank 5 and a printing head portion 12 are integrally disposed on the carriage 6.

Outlet opening/closing means 19 for opening/closing an ink outlet 20 feeds the ink in the ink tank 5 to a printing head portion 12 at the front (the left portion in FIG. 6) of the ink tank 5. The outlet opening/closing means 19 comprises an opening/closing lid 21 made of rubber of opening/closing an ink outlet 20, an operating rod 22 protruded above the ink tank 5 from the opening/closing lid 21, a bellows-type expansion sleeve 23 covering around the operating rod 22, a compression coil spring 24 attached to the upper edge of the operating rod 22, and a spring bearing member 25 receiving this compression coil spring 24. The end of the operating arm 27 extended from a maintenance station 26 abuts on the upper portion of the spring bearing member 25 to open/close the outlet opening/closing means 19 together with the movement around a supporting point 30 of the operating arm 27. More specifically, when the operating arm 27 rotates clockwise about the supporting point 30 to push the spring bearing member 25, the operating rod 22 and the opening/closing lid 21 fall against the force of the compression coil spring 24 to close the ink outlet 20. Contrarily, when the pushing force of the end of the operating arm 27 is released, the operating rod 22 and the opening/closing lid 21 rise by the force of the compression coil spring 24 to open the ink outlet 20.

The maintenance station is placed at one end (the left end of in FIG. 1) of the moving stroke of the carriage 6, the lower the operating arm 27 toward the carriage 6 during power off. More specifically, as shown in FIG. 6, while the printer is in the power on state, the operating arm 27 is withdrawn upward and the outlet opening/closing means 19 is forced to rise by the compression coil spring 24 to open the ink outlet 20. While in the power off state, the operating arm 27 falls, as shown in FIG. 8, and the outlet opening/closing means 19 is lowered against the compression spring 24 to close the ink outlet 20.

Figure 3:
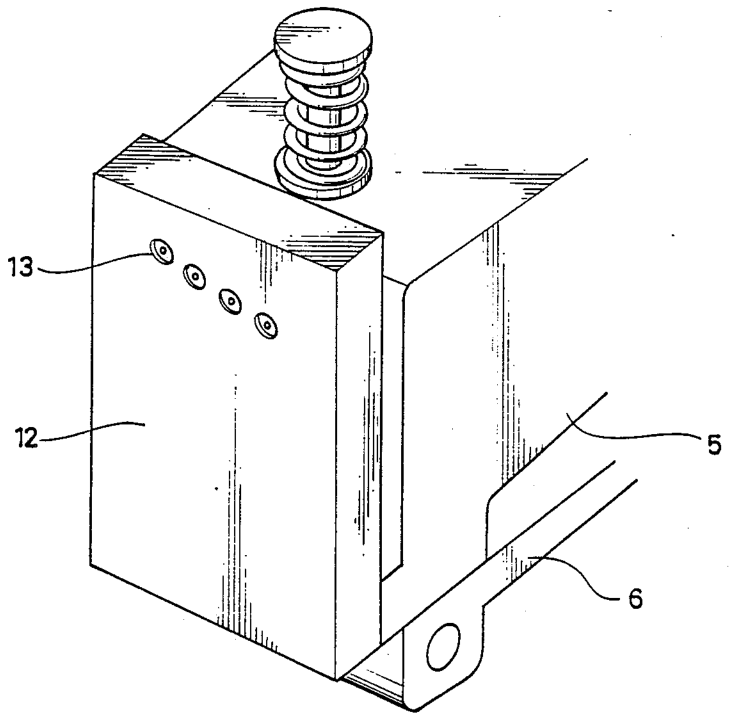
FIG. 3 PRIOR ART
FIG. 3 is a perspective view showing an enlarged peripheral portion of a printing head portion of the ink jet printer shown in FIG. 1.
Figure 4:
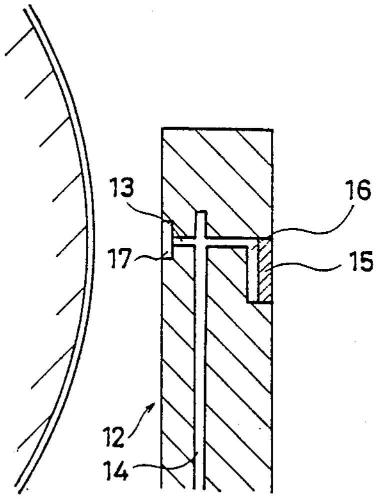
FIG. 4 PRIOR ART
FIG. 4 is a sectional view showing an enlarged structure in the vicinity of a nozzle of the printing head portion.
Figure 5:
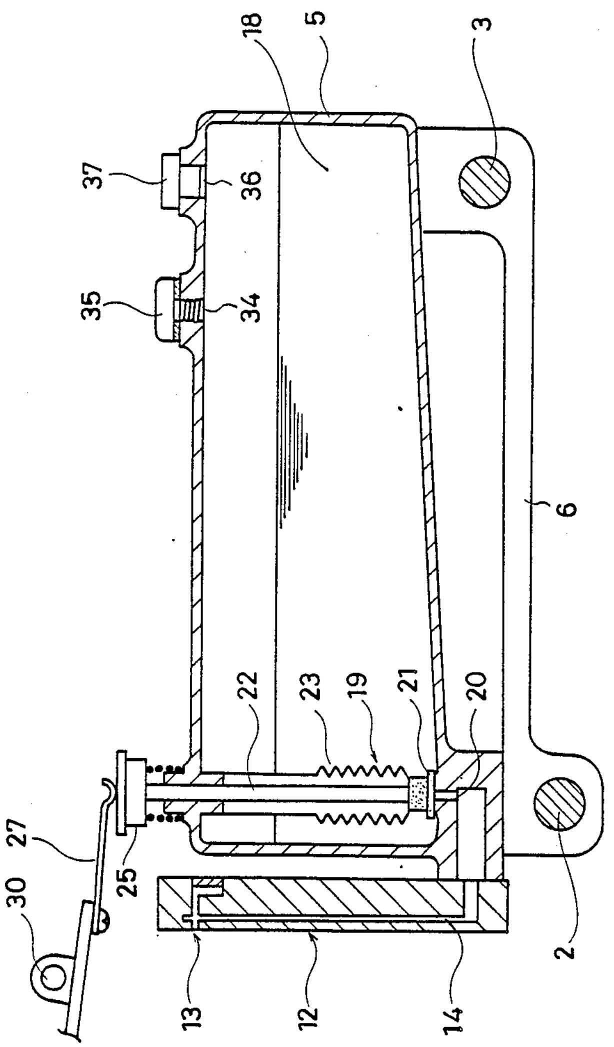
FIG.5 PRIOR ART
FIG. 5 is a sectional view of a ink reservoir of the conventional ink jet printer shown in FIG. 1 which is in a power off state.

The printing head portion 12 in this embodiment is the same as the conventional one shown in FIGS. 3 and 4. More specifically, the ink from the ink tank 5 is directed to a capillary 14 in the printing head portion 12 and it is fed to the nozzle 13 by the capillary phenomenon. In printing, a piezoelectric element 15 is vibrated by a signal applied through a lead line 38 (shown in FIG. 1) so that the ink in the nozzle 13 is jetted from the nozzle outlet 17 by pressure applied to a pressure chamber 16 by its pumping action.

Figure 2:
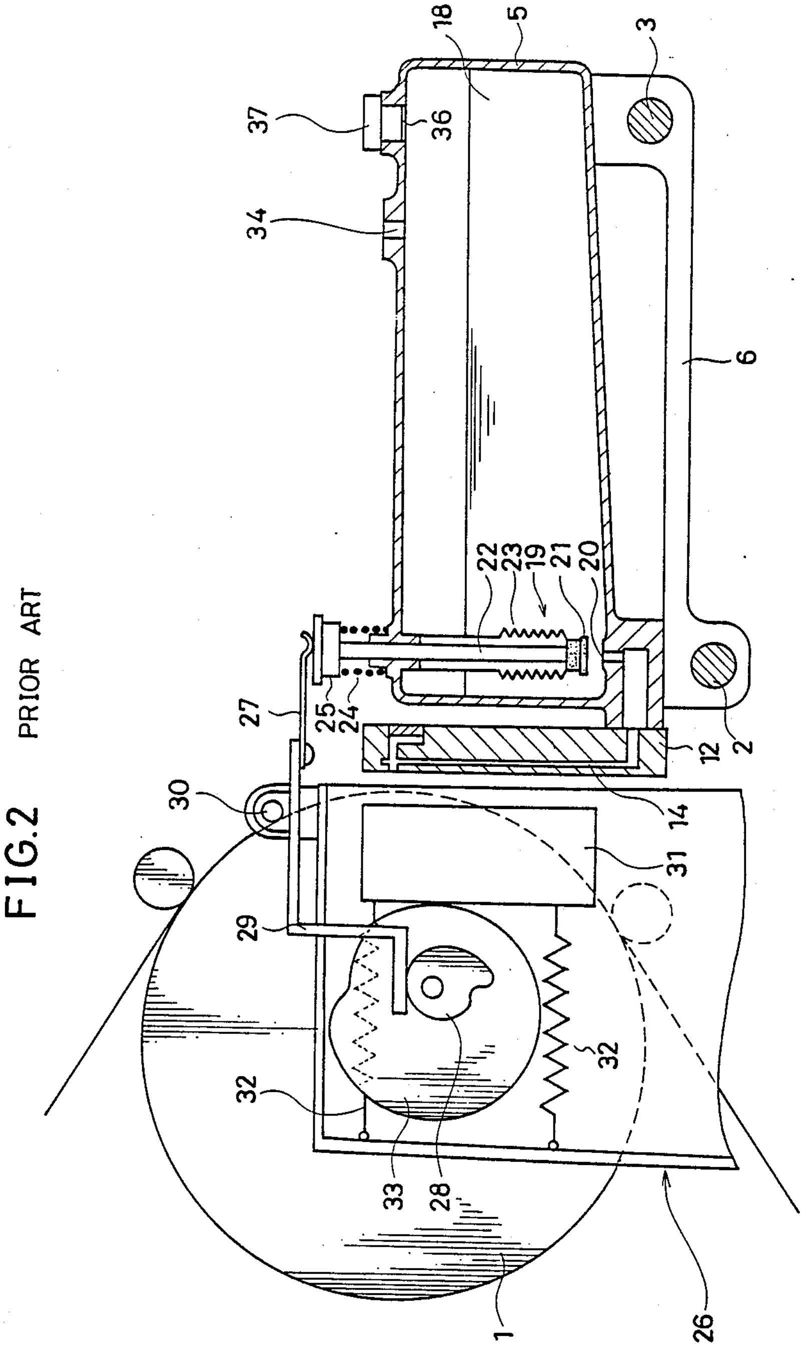
FIG.2 PRIOR ART
FIG. 2 is a sectional view taken along a line A—A in FIG. 1.

The ink jet printer using the ink resevoir of the embodiment comprises a nozzle protecting means 31 like the conventional one shown in FIG. 2. More specifically, the nozzle protecting means 31 disposed at the front portion of the printing head portion 12 is driven together with the operation of the operating arm 27 to prevent ink from clogging up due to drying or bubbles from being mixed in the nozzle 13 when the power is off.

At the rear upper portion of the ink tank 5, an inlet cover 52 opening the ink inlet 51 and covering over the ink inlet 51 is attached such the it can be opened and closed about the forward supporting point 53. A cap 54 for the ink inlet 51 is provided inside of the inlet cover 52. The cap 54 is structured such that is closed the ink inlet 51 when the inlet cover 52 is closed and it opens the ink inlet 51 when the inlet cover 52 is opened. A vent hole 55 is formed on the cap 54. A valve 56 opening/closing the vent hole 55 is provided through a plate spring 57 having one end fixed in the inlet cover 52 and the valve 56 closes the vent hole 57 by an elastic restoring force of the plate spring 57 in the normal state.

An operating shaft 58 with a notch rotated by enganging with the free end of the plate spring 57 is provided in the inlet cover 52. On the other hand, a bell crank 60 engaging from the lower part with the flange portion 59 formed in the spring bearing member 25 of the outlet opening/closing means 19 is movably attached about the supporting point 61 in the vicinity of the front end of the inlet cover 52 and this bell crank 60 and the operating shaft 58 are connected so as to interlock with each other by a pushing/pulling link 62. In addition, a rotary force is always applied to the operating shaft 58 in a counterclockwise direction by providing a tension spring 63 between the pushing/pulling link 62 and the supporting point 61 of the bell crank 60. This rotary force is set stronger than the elastic restoring force of the plate spring 57.

Description is now given of the operation of the thus structured ink reservoir of this embodiment.

The inlet cover 52 is closed in a state other than that of supplying ink and fixed through an engaging lock portion 64.

When the printer power is on, as shown in FIG. 6, the end of the operating arm 27 is withdrawn upward and the operating rod 22 rises to open the ink outlet 20 and the bell crank 60 is allowed to rotate clockwise following the rise of the spring bearing member 25. Then, the operating shaft 58 is also rotated counterclockwise to push upward the free end of the engaging plate spring 57 to separate the valve 56 from the vent hole 55. As a resutl, the inside of the ink tank 5 is connected to the outside through the vent hole 55 and ink can be smoothyl supplied to the printing head portion 12.

When the printer is switched to the power off state, the operating arm 27 is lowered a driving means see FIG. 2) provided in the maintenance station 26. As a result, as shown in FIG. 8, the operating rod 22 is forcibly lowered to close the ink outlet 20 and the bell crank 60 is forcibly rotated counterclockwise against the extension spring 53 in accordance with the fall of the spring bearing member 25. Then, the operating shaft 58 rotates clockwise, so that the plate spring 57 becomes free and the valve 56 closes the vent hole 55. More specifically, during the power off state, the ink tank 5 is completely closed with the ink inlet 51 and the vent hole 55, so that the ink cannot leak during transportation.

While ink is supplied, the inlet cover 52 is opened upward as shown by a phantom line in FIG. 8. As a result, the upper surface of the ink tank 5 appears and the ink inlet 51 is opened, so that ink can be supplied to the ink tanks from an ink cartridge (not shown) loaded on the upper portion of the ink tank 5. In the open state of the inlet cover 52 during supplying ink, the bell crank 60 does not abut on the flange portion 59, (referring to a phantom line in FIG. 8). Therefore, the bell crank 60, the pushing/pulling link 62 and the like are kept in a stationary state while the counterclockwise rotary force of the operating shaft 58 by the tension spring 63 overcomes the force of the plate spring 57, and the valve 56 is opened.

Figure 9:
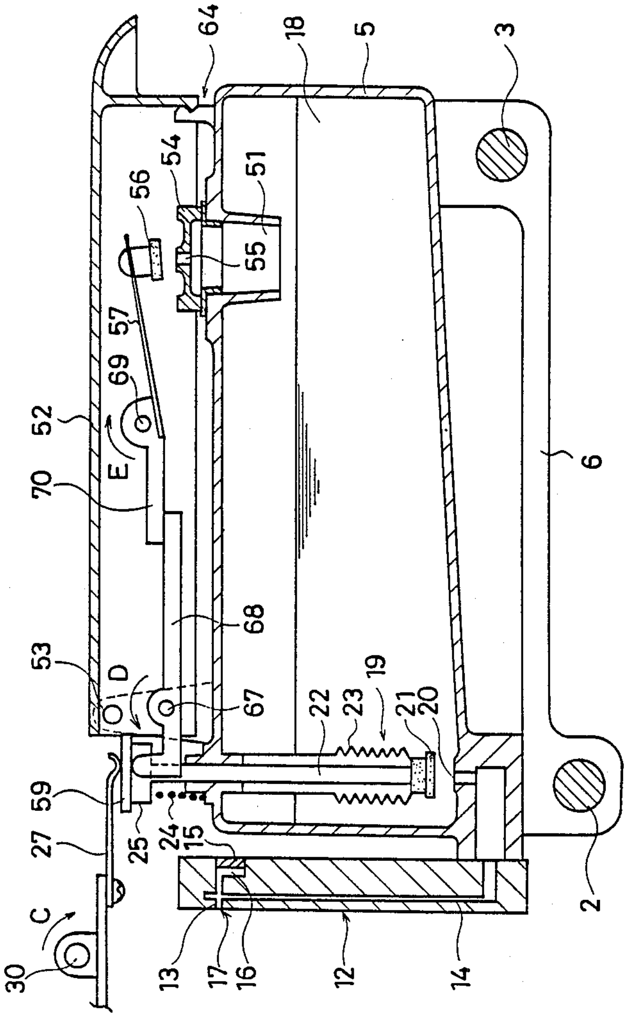
FIG. 9 is a sectional view showing another embodiment of the present invention.

In addition, although the bell crank 60, the pushing-/pulling link 62, the operatig shaft 58 and the plate spring 57 are used in order to interlock the operating arm 27 with the valve 56 in the above embodiment, both can be interlocked by another mechanism shown in FIG. 9. Interlocking means shown in FIG. 9 comprises a pivot lever 68 pivoting on a supporting shaft 67 fixed to an inlet cover 52 and a pivot lever 70 pivoting on a supporting shaft 69 fixed to an inlet cover 52. A plate spring 57 attached with a valve 56 has one end fixed to the pivot lever 70 and these pivot integrally on the supporting shaft 69. One end of the pivot lever 68 abuts on a flange portion 59 of a spring bearing member 25 and the other abuts on one end of the pivot cover 70. When outlet opening/closing means 19 closes, an operating lever 27 and the pivot levers 68 and 70 pivot in directions shown by arrows C, D and E, respectively, so that the valve 56 closes the vent hole 55.

Figure 10:
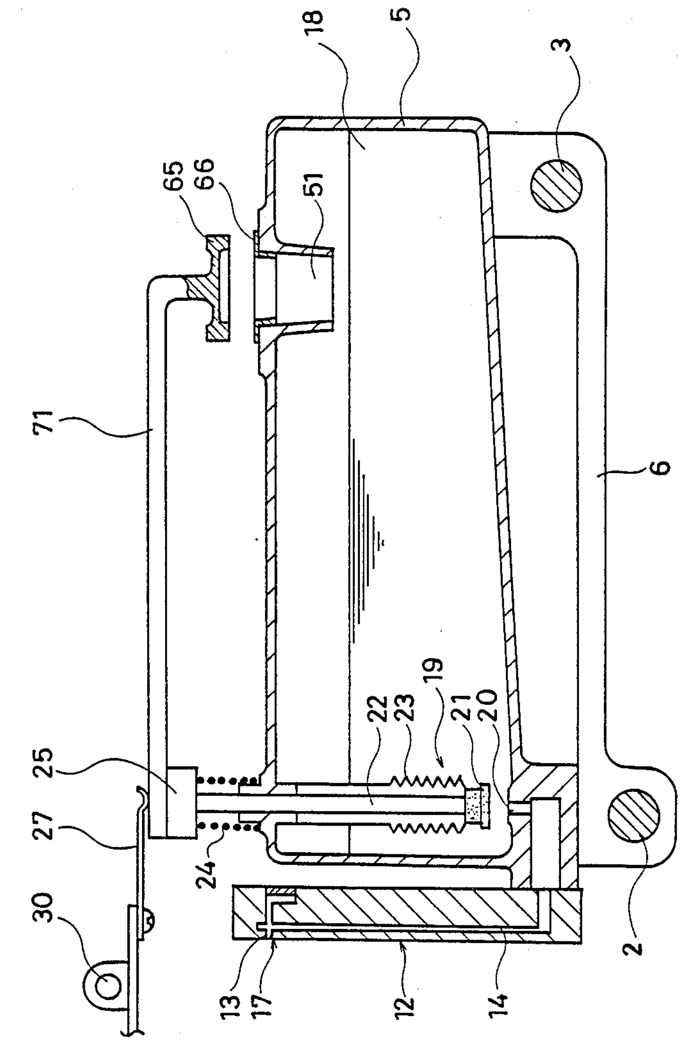
FIG. 10 is a sectional view showing still another embodiment for attaining the most fundamental operation effect of the present invention.

Also, although the cap 54 abutting on the ink inlet 51 is provided and a vent hole 55 is formed in this cap 54 and this vent hole 55 is closed by the valve 56, another structure may be applied. More specifically, it can be implemented to prevent a human error in opening/closing the vent hole by mechanically interlocking the opening/closing operation of the outlet opening/closing means with the opening/closing operation of the vent hole which are fundamental operational effects of the present invention, by a mechanism more simple than that of the above described embodiment. That example is shown in FIG. 10. In an ink reservoir shown in FIG. 9, an ink inlet 51 is used also as a vent hole. The ink inlet 51 is opened and closed by an opening/closing member 65 serving as both cap 54 and valve 56 in the embodiment shown in FIGS. 6 to 8 through a packing 66. The opening/closing member 65 is fixed to the end of the rod 71 fixed to the upper portion of the spring bearing member 25 of the outlet opening/closing means 19 and moves integrally and vertically with the rising/falling movement of an operating rod 22 and an opening/closing lid 21. Therefore, while an ink outlet 20 is closed by the lid 21, an ink inlet 55 is also closed by the opening/closing member 65. On the other hand, while the ink outlet 20 is opened, the ink inlet 51 is also opened to serve as a vent hole.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An ink reservoir of an ink jet printer for supplying ink to a nozzle portion jetting the ink comprising:

an ink tank (5) having an ink outlet (20) storing ink feeding the stored ink to said nozzle and a vent hole (34) for circulating air between an external atmosphere and an internal space;

an outlet opening/closing means (19) movably provided for opening/closing said ink outlet (20);

vent hole opening/closing means (56) and (57) movably provided for opening/closing said vent hole (34); and operation transferring means (58), (60) and (62) for mechanically transferring the movement of said outlet opening/closing means (19) to said vent hole opening/closing means (56) and (57) so as to interlock the opening/closing operation of said outlet opening/closing means (19) with the opening/closing operation of said vent hole opening/closing means (56) and (57).

2. An ink reservoir of an ink jet printer in accordance with claim 1, further including forceing means (24) for forcing said outlet opening/closing means (19) to be open.

3. An ink reservoir of an ink jet printer in accordance with claim 2, wherein said outlet opening/closing means comprises a pushing portion (59) pushed downward by an operating arm (27) extended from a maintenance station (26) of said ink jet printer.

4. An ink reservoir of an ink jet printer in accordance with claim 1, wherein said operation transferring means (58), (60) and (62) comprises at first moving member (60) being in contact with said outlet opening/closing means (19) and moving with the operation of said outlet opening/closing means (19) and a second moving member (58) disposed so as to be in contact with said vent hole opening/closing means (57) and (56) and moving in response to the operation of said first moving member (60).

5. An ink reservoir of an ink jet printer in accordance with claim 4, wherein said operation transferring means (58), (60) and (62) further comprises a third moving membe (62) having one end connected to said first moving member (60) and the other end connected to said second moving member (58).

6. An ink reservoir of an ink jet printer in accordance with claim 5, wherein said ink tank comprises an attaching member (52), said first and second moving members (60) and (58) are rotatably attached to said attaching member (52) and said third moving member (62) has its one end connected to said first moving member (60) and the other connected to said second moving member (58).

7. An ink reservoir of an ink jet printer in accordance with claim 4, wherein said operation transferring means (58), (60) and (62) further, comprises a contacted state maintaining means (63) for maintaining the contacted state between said first moving member (60) and said outlet opening/closing means (19).

8. An ink reservoir of an ink jet printer in accordance with claim 4, wherein said ink tank comprises an attaching member (52) and said first and second moving members (60) and (58) are movably attached to said attaching member (52).

9. An ink reservoir of an ink jet printer in accordance with claim 1, wherein said ink tank (5) comprises an attaching member (52), and said vent hole opening/closing means (56) and (57) comprises a valve (56) for opening/closing said vent hole (55) and a plate spring (57) having its one end fixed to said attaching membe (52) and supporting said valve (56) so as to force it an opening direction.

10. An ink reservoir of an ink jet printer in accordance with claim 1, wherein said operation transferring means (58), (60) and (62) comprises a first moving member (60) being in contact with said outlet opening/closing means (19) and moving with the operation of the outlet opening/closing means (191), a second moving member (58) constituting said vent hole opening/closing means and disposed so as to abut on a plate spring (57) attached with a valve (56) opening/closing said vent hole (55) and to move in response to the transferred operation of sad first moving member (60), a third moving member (62) having one end connected to said first moving member (60) and the other end connected to said second moving member (58) and said second moving member (58) has a peripheral surface displacing which displaces said plate spring (57) by its rotation.

11. An ink reservoir of an ink jet printer in accordance with claim 1, wherein said operation transferring means comprises a connecting member (71) integrally connecting said outlet opening/closing means (19) and said vent hole opening/closing means (56) and (57).

12. An ink reservoir of an ink jet printer in accordance with claim 11, wherein said ink reservoir further comprises forceing means (24) for forcing said outlet opening/closing means (19) to be open.

13. An ink reservoir of an ink jet printer in accordance with claim 12, wherein said outlet opening/closing means (19) comprises a pushing portion (59) pushed downward by an operating arm (27) extended from a maintenance station (26) of the ink jet printer.

14. An ink reservoir of an ink jet printer in accordance with claim 1, wherein said ink tank (5) comprises an attaching member (53) fixedly provided, and an inlet cover (52) attached to said attaching member so as to be able to move between the position covering said ink inlet (51) formed in said ink tank (5) and the position exposing said ink inlet (51), and said operation transferring means (58), (60) and (62) and said vent hole opening/closing means (56) and (57) are attached to said inlet cover (52).

15. An ink reservoir of an ink jet printer for supplying ink to a nozzle portion jetting the ink comprising:

- an ink tank (5) having an ink outlet (20) storing ink and feeding the ink to said nozzle portion and an ink inlet (51) for supplying ink;
- outlet opening/closing means (19) movably provided for opening/closing said ink outlet (20);
- an attaching member (53) fixedly provided in said ink tank (5);
- an inlet cover (52) attached to said attaching member (53) so as to be able to move between a position covering said ink inlet (51) and a position exposing said ink inlet (51);
- an inlet cap (54) having a vent hole (55) for closing said ink inlet (51);
- vent hole opening/closing means (56) attached to said inlet cover (52) for opening/closing said vent hole (55);
- operation transferring means (58)8 (60) and (62) attached to said inlet cover (52) for mechanically transferring movement of said outlet opening/closing means (19) to said vent hole opening/closing means (56) and (57) so as to interlock the operation of said outlet opening/closing means (19) with the operation of said vent hole opening/closing means (56) and (57).

16. An ink reservoir of an ink jet printer in accordance with claim 15, further comprising forcing means (24) for forcing said output opening/closing means (19) to be open.

17. An ink reservoir of an ink jet printer in accordance with claim 16, wherein said outlet opening/closing means (19) comprises a pushing portion (59) pushed downward by an operating arm (27) extended from a maintenance station (26) of an ink jet printer.

18. An ink reservoir of an ink jet printer in accordance with claim 15, wherein said operation transferring means (58), (60) and (62) comprises a first moving member (60) being in contact with said outlet opening/closing means (19) and moving with the operation of the outlet opening/closing means (19) and a second moving member (58) disposed so as to be in contact with said vent hole opening/closing means (57) and (56) and moving in response to the transferred operation of said first moving member (60).

19. An ink reservoir of an ink jet printer in accordance with claim 18, wherein said operation transferring means (58), (60) and (62) further comprises a third moving member (62) having one end connected to said first moving member (60) and the other connected to said second moving member (58).

20. An ink reservoir of an ink jet printer in accordance with claim 19, wherein said first and second moving members (60) and (58) are pivotably attached to said inlet cover (52) and said moving member (62) has one end connected to said first moving member (60) and the other connected to said second moving member (58).

21. An ink reservoir of an ink jet printer in accordance with claim 18, wherein said operation transferring means (58), (60) and (62) further comprises contacted state maintaining means (63) for maintaining a contacted state with said first moving member (60) and said outlet opening/closing means (19).

22. An ink reservoir of an ink jet printer in accordance with claim 18, wherein said first and second moving members (60) and (58) are movably attached to said inlet cover (52).

23. An ink reservoir of an ink jet printer in accordance with claim 15, wherein said vent hole opening/closing means (56) and (57) comprises a valve (56) opening/closing said vent hole (55) and a plate spring (57) having one end fixed to said inlet cover (52) to force said valve (56) in an opening direction.

24. An ink reservoir of an ink jet printer in accordance with claim 15, wherein said operation transferring means (58) (60) and (62) comprises a first moving member (60) being in contact with said outlet opening/closing means (19) and moving with the operation of the outlet opening/closing means (19), a second moving member (58) constituting said vent hole opening/closing means (57) and (56) and disposed so as to abut on a plate spring (57) attached with a valve (56) opening/closing said vent hole (55) and disposed so as to move in response to the transferred operation of a first moving member (60), and a third moving member (62) having one end connected to said first moving member (60) and the other end connected to a second moving member (58), and said second moving member (58) has a peripheral surface displacing said plate spring (57) by its rotation.

25. An ink reservoir of an ink jet printer in accordance with claim 15, wherein said operation transferring means comprises a first moving member (68) being in contact with said outlet opening/closing means (19) and moving with the operation of the outlet opening/closing means (19) and a second moving member (70), disposed so as to be able to move integrally with said vent hole opening/closing means (57) and (56) and moving in response to the transferred operation of said first moving member (68).

* * * * *